(12) United States Patent
Takano et al.

(10) Patent No.: US 6,405,702 B2
(45) Date of Patent: Jun. 18, 2002

(54) BALANCER SHAFT FOR INTERNAL COMBUSTION ENGINE

(75) Inventors: Tomotaka Takano; Kaoru Okui; Yasuyuki Matsuno, all of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/681,313

(22) Filed: Mar. 16, 2001

(30) Foreign Application Priority Data

Mar. 24, 2000 (JP) ........................................ 2000-084842
Mar. 24, 2000 (JP) ........................................ 2000-084852

(51) Int. Cl.[7] ................................................ F02B 75/06
(52) U.S. Cl. .................................. 123/192.2; 123/90.31
(58) Field of Search ............................ 123/90.31, 192.2

(56) References Cited

U.S. PATENT DOCUMENTS

| | | |
|---|---|---|
| 1,225,355 A | 5/1917 | Pogue |
| 4,480,607 A | 11/1984 | Tsai et al. |
| 4,509,378 A | 4/1985 | Brown |
| 4,617,885 A * | 10/1986 | Oshiro et al. ............ 123/192.2 |
| 5,253,547 A | 10/1993 | Yoneyama et al. |
| 5,740,768 A * | 4/1998 | Sakurai et al. ........... 123/90.31 |

FOREIGN PATENT DOCUMENTS

| | | | |
|---|---|---|---|
| EP | 0 076 358 A | 4/1983 | |
| JP | 2-245412 | * 10/1990 | .............. 123/192.2 |

* cited by examiner

Primary Examiner—Noah P. Kamen
(74) Attorney, Agent, or Firm—Ernest A. Beutler

(57) ABSTRACT

An internal combustion engine having a crankshaft, at least one camshaft, a balancer shaft and a timing drive for driving the camshaft and the balancer shaft from the crankshaft. The balancer shaft has a drive member that is interposed in the timing drive and a torsional vibration damper that is interposed between this drive member and the balancer masses on the balancer shaft to avoid transmission of crankshaft vibrations to the balancer shaft without effecting the valve timing. balancer shaft is provided that has at least offset balance masses formed thereon. The balancer shaft is also formed with integral bearings directly on opposite sides of each of the balance masses.

23 Claims, 7 Drawing Sheets

BALANCER SHAFT FOR INTERNAL COMBUSTION ENGINE

BACKGROUND OF INVENTION

Arrangements have been provided for improving smoothness in engine operation by having a balancer shaft that is driven from the crankshaft and which has a pair of counter weights on it, which balance certain vibrational forces of the engine. As noted, this type of arrangement is generally driven off of the crankshaft and frequently is interposed in the drive train to the camshaft or camshafts of the engine. The difficulty with this that the balancer shaft itself can present some torsional vibrations that can influence the engine operation. That is, the crankshaft vibrations can be transmitted to the balancer shaft and cause noise or decrease durability. Although torsional dampers can be employed, the previous interpositioning of the torsional damper in the balancer shaft drive has been avoided because of the fact that it can introduce variations in valve timing. If there is a torsional damper in the drive for the balancer shaft, the action of the torsional damper may also affect the timing between the crankshaft and the camshaft or camshafts.

It is, therefore, a principal object to this invention to provide an improved balancer shaft arrangement for an engine that can be interposed in the camshaft drive and will not affect the timing of the opening and closing of the valves.

A further problem in connection with the conventional type of balancer shaft mounting also deals with the journalling and loads on the bearings as may be best understood by reference to FIG. 1 which is a view showing a prior art type of balancer shaft, indicated generally by the reference numeral 11. The balancer shaft 11 has a main shaft portion that is formed integrally with a plurality of axially spaced bearings 12, 13, 14 and 15 by which the shaft 11 is journalled. A first balancer mass 16 is interposed between the bearings 12 and 13 and a second balancer mass 17 is interposed between the bearings 14 and 15.

The drive gear for the balancer shaft 11, indicated by the reference numeral 18, is also located adjacent the balancer mass 17 and between the two bearings 14 and 15. As a result of this construction, there is an uneven loading on the bearings 12, 13, 14 and 15 with those associated with the mass 17 and drive gear 18 being greater than those applied to the remaining bearings (12 and 13). This has resulted in the necessity for making the shaft of a greater diameter than desirable in order to reduce the loading and also requires enlargement of the bearings for the same purpose.

It is, therefore, a further object to this invention to provide an improved bearing arrangement for a balancer shaft of an engine wherein the loading on the individual bearings is significantly reduced.

SUMMARY OF INVENTION

A first feature of this invention is adapted to be embodied in an internal combustion engine having a crankshaft, at least one camshaft, a balancer shaft and a timing drive for driving the camshaft and the balancer shaft from the crankshaft. The balancer shaft has a drive member that is interposed in the timing drive and a torsional vibration damper that is interposed between this drive member and the balancer masses on the balancer shaft.

In accordance with another feature of the invention, a balancer shaft is provided that has at least offset balance masses formed thereon. The balancer shaft is also formed with integral bearings directly on opposite sides of each of the balance masses.

DETAILED DESCRIPTION

Figure 1:
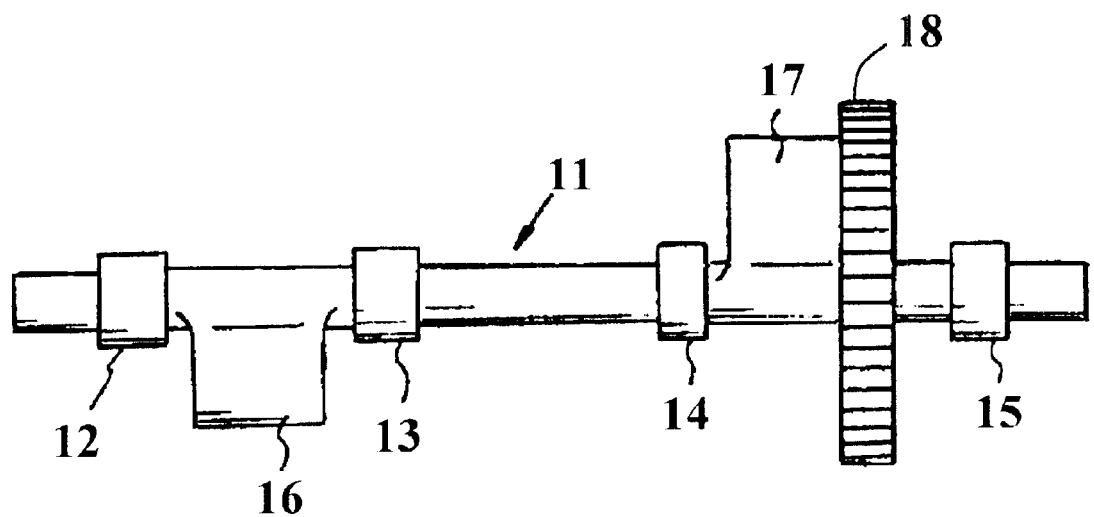
FIG. 1 is a side elevational view of a balance shaft of the prior art type.
Figure 2:
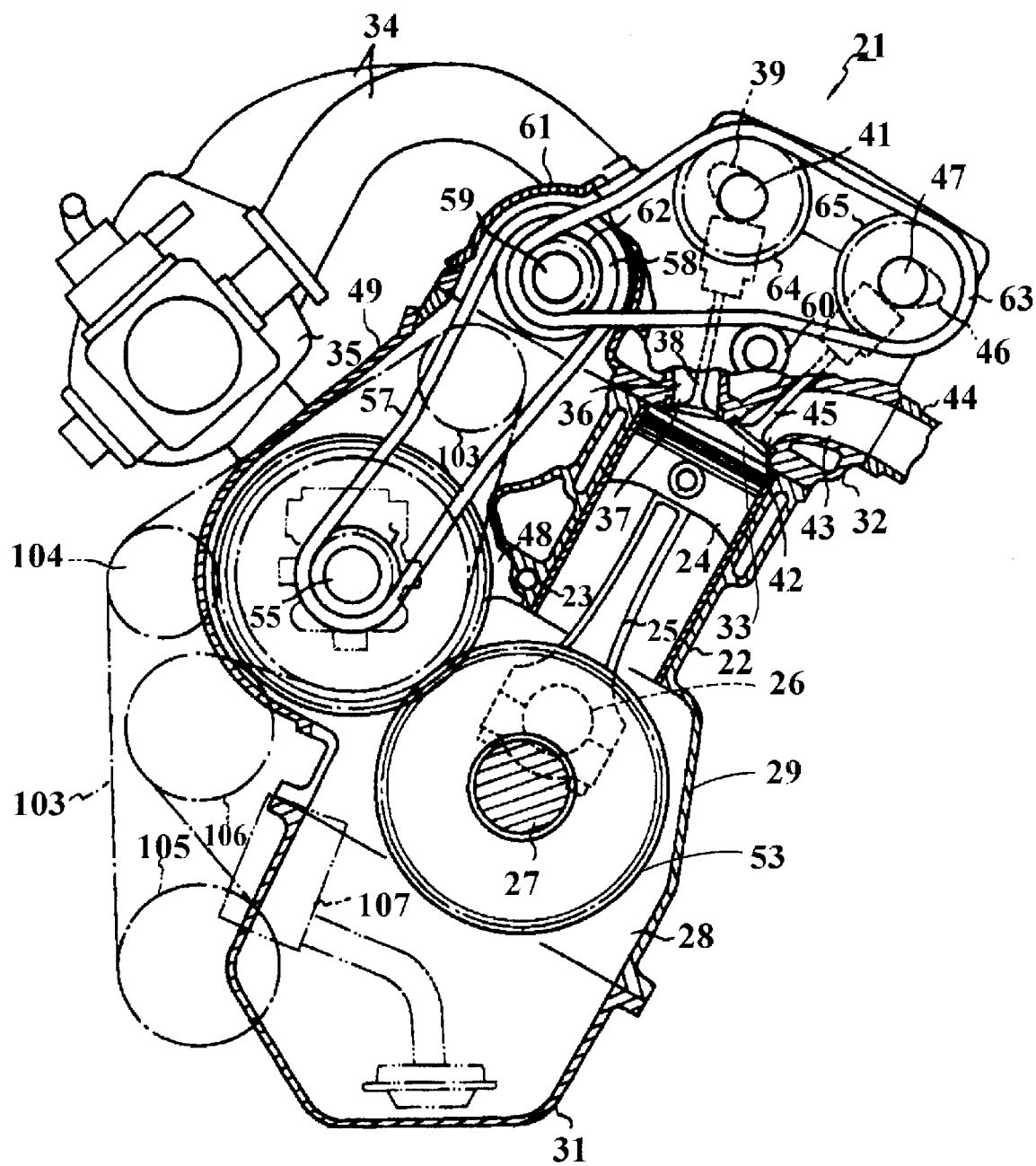
FIG. 2 is a cross sectional view taken through the valve timing and balancer shaft drive of an internal combustion engine constructed in accordance with an embodiment of the invention.

Referring now in detail to the drawings and initially to FIG. 2, an internal combustion engine constructed in accordance with an embodiment of the invention is identified generally by the reference numeral 21. In the illustrated embodiment, the engine 21 is primarily intended for use in automotive applications and particularly automotive applications having transverse engine placements, although the invention is obviously not so limited, so as to require a compact overall engine construction.

The engine 21 is comprised of a cylinder block 22 that defines one or more in-line cylinder bores 23. In the illustrated embodiment, these cylinder bores 23 are formed by liners that are pressed or cast into the cylinder block 22 and there are five (5) of them. Pistons 24 reciprocate in these cylinder bores 23 and are connected by means of connecting rods 25 to the throws 26 of a crankshaft 27. Because of the transverse positioning of the engine 21 in the engine compartment, the axis of rotation of the crankshaft 27 is disposed transversely of the longitudinal centerline of the associated vehicle.

The crankshaft 27 is journalled for rotation in a known manner within a crankcase chamber 28 formed by a skirt 29 of the cylinder block 22 and a crankcase member 31 that is affixed thereto.

A cylinder head member 32 is affixed to the cylinder block 22 in a suitable manner. The cylinder head member 32 has individual recesses 33 that cooperate with the pistons 24 and cylinder bores 23 to form the combustion chambers of the engine 21.

An induction system is provided for delivering at least an air charge to these combustion chambers. This induction system includes an intake manifold 34 that is disposed on one side of the cylinder head member 32. It will also be noted that the cylinder bores 23 are canted at an acute angle to a vertical plane so as to provide a more compact assembly and lower height for the engine.

The induction system includes a throttle body 35 for controlling the airflow to the engine combustion chambers. In addition, an air filter and silencing arrangement as well as a plenum chamber may also be provided for the intake manifold 34.

The intake manifold 34 serves intake passages 36 formed in one side of the cylinder head member 32 and which terminate at intake valve seats 37. Poppet type intake valves 38 are supported in a known manner within the cylinder head member 32 and are biased to a closed position by a suitable return spring arrangement. The intake valves 38 are opened by the lobes 39 of a intake camshaft 41 which is driven through a timing drive at one half crankshaft speed, which timing drive will be described later.

Fuel is supplied to the inducted air charge either by one or more carburetors or fuel injectors. If fuel injectors are employed, they may be either of the manifold or direct cylinder injection type.

Spark plugs (not shown) are mounted in the cylinder head member 32 for firing the fuel air charge formed in the combustion chambers.

The exhaust gases are discharged through exhaust valve seats 42 into exhaust passages 43. The exhaust passages 43 are served by an exhaust manifold 44 which collects the exhaust gases and discharges them to the atmosphere through a suitable exhaust system (not shown).

Exhaust valves 45 are slidably supported in the cylinder head member 32 and are biased to their closed positions by means of a suitable spring arrangement. The exhaust valves 45 are opened by the lobes 46 of an exhaust camshaft 47 that is journalled within the cylinder head member 32 for rotation about an axis parallel to that of the intake camshaft 41 and the crankshaft 27. The aforenoted timing drive, which will be described in detail shortly, also drives the exhaust camshaft 47 at one half the rotational speed of the crankshaft 27.

The timing drive for driving the intake and exhaust camshafts 41 and 47, respectively, from the crankshaft 27 will now be described continuing to refer to FIG. 2 and also now referring to FIG. 3. As may be seen in FIG. 2, a timing case, indicated generally by the reference numeral 48 is formed on the intake side of the engine and specifically the cylinder block 22. A timing cover 49 is affixed to this side of the cylinder block and closes the timing case 48 while allowing service access to the timing drives contained therein, as will become apparent.

It has been noted that the engine 21 is a multi-cylinder engine and the crankshaft 27 has in addition to main bearing portions 51 that are journalled in the crankcase chamber 28 in addition to the already noted individual throws 26 on which the big ends of the connecting rods 25 are journalled. Adjacent one of these throws, the crankshaft 27 is formed with an integral timing gear 53 which is enmesh with a driven timing gear 54 of an intermediate, balancer shaft, indicated generally by the reference numeral 55. The balancer shaft 55 is journalled in the engine body in a manner, which will be described later.

A timing sprocket 56 is affixed to one end of the intermediate balancer shaft 55 and drives a timing chain 57. The timing chain 57, in turn, drives a driving sprocket 58 of a camshaft driving shaft 59, which is journalled at one side of the cylinder head member 32 in an area enclosed by a second timing cover 61. Adjacent the driving sprocket 58 on the camshaft driving shaft 59 and disposed more closely to one end of the engine 21 is a second timing sprocket 62.

This timing sprocket 62 drives a further timing chain 63, which, in turn, is entrained around an intake camshaft driving sprocket 64 and an exhaust camshaft driving sprocket 65. An idler sprocket 60 (FIG. 2) maintains tension in the chain 63. In addition, a water pump (not shown) may be driven by this idler sprocket 60.

Figure 3:
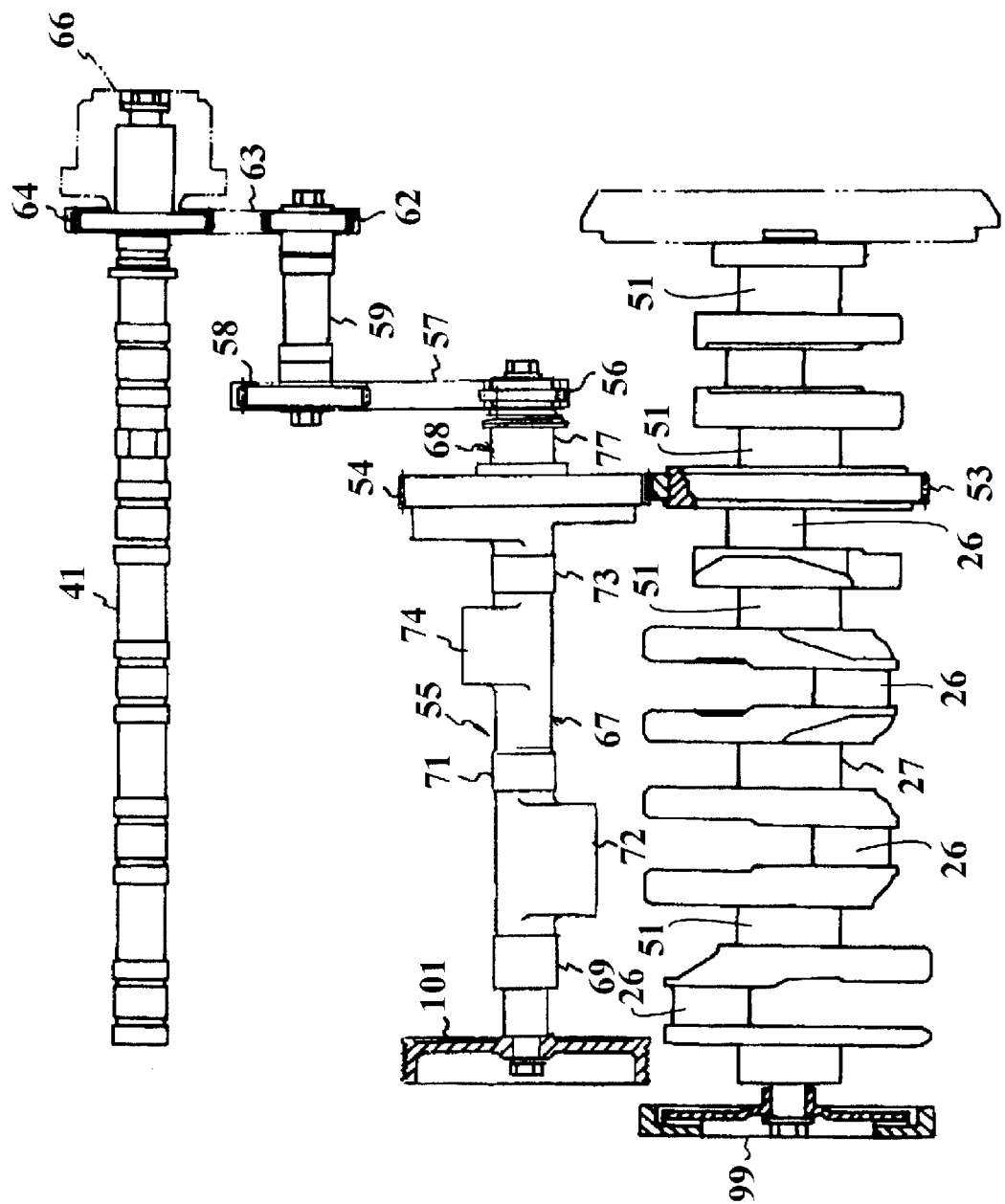
FIG. 3 is a lay out type view showing the timing drive and specifically the crankshaft, balancer shaft, and intermediate shaft and one of the two driven camshafts.
Figure 4:
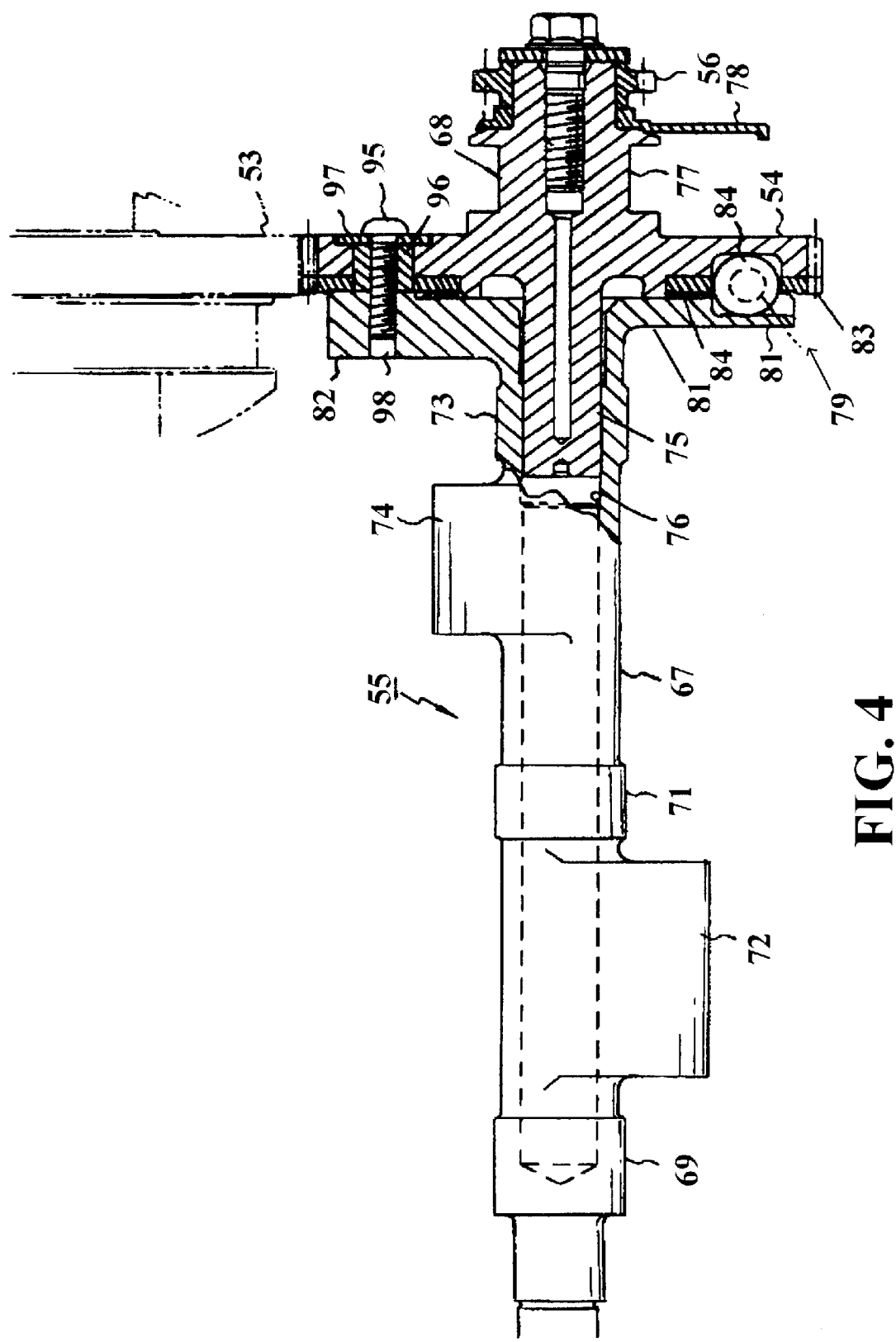
FIG. 4 is an enlarged side elevational view of the balancer shaft looking in the same direction as FIG. 2 and with a portion broken away along the line 4—4 of FIG. 5 so as to more clearly show the drive arrangement.
Figure 5:
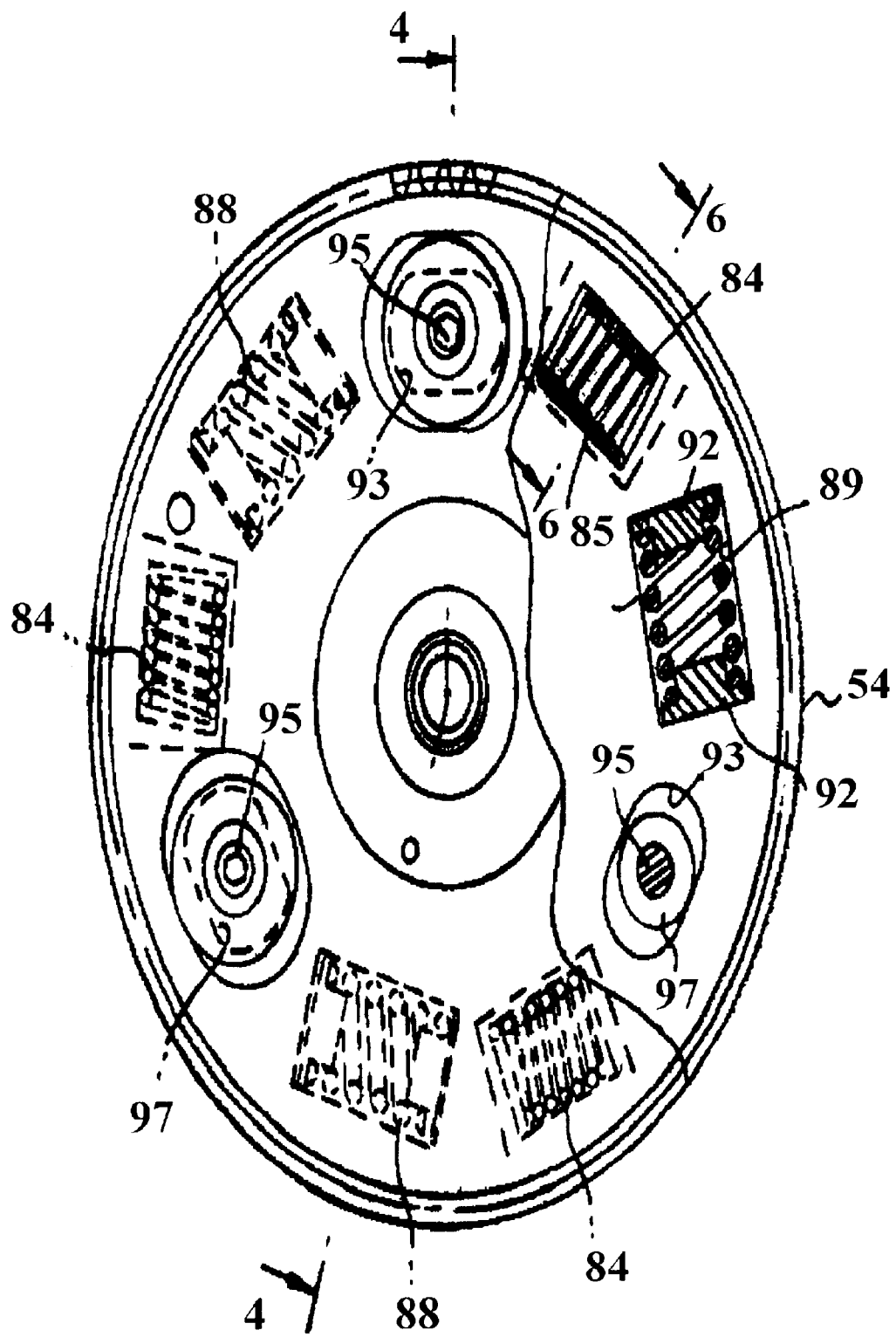
FIG. 5 is a view looking perpendicular to FIG. 4 along the shaft axis and showing the drive mechanism for the balancer shaft with portions broken away and shown in section.

The either or both of intake and exhaust timing sprockets 64 and 65 may be connected to the respective intake and exhaust camshaft 41 and 47 through variable valve timing mechanisms, indicated schematically in FIG. 3 by the reference numeral 66.

It should be understood that the intake and exhaust camshafts 41 and 47 are driven at one half the rotational speed of that of the crankshaft 27 and this speed reduction can take place in stages between the flexible transmitter or chain drives 57 and 63. It is preferred that the intermediate balancer shaft 55 is driven at the same speed but in the opposite direction from the crankshaft 27 for a reason now to be described.

The construction of the balancer shaft 55 will now be described primarily by reference to FIGS. 4–7. The balancer shaft 55 is made up of a first, counterweighted portion 67 and a second, non-counter balanced, driving portion 68. It is the driving portion 68 to which the timing sprocket 56 for driving the chain 57 is affixed. In addition, it is this portion, which forms the timing gear 54.

The counter balanced weighted portion 67 is formed with two integral, axially spaced bearing portions 69 and 71 which are disposed on opposite sides of a first inertial mass 72. In addition, a third bearing portion 73 is formed on the opposite side of a second balancer mass 74 from the bearing portion 71. The bearing portions 69, 71 and 73 are suitably journalled in the cylinder block 22 at one side thereof. Hence, the journalling for this counter balanced portion 67 is provided primarily by the bearing portions 69, 71 and 73 with bearing portions being formed on opposite sides of each of the balancer masses 72 and 74. The bearing portion 71 is disposed closer to the balancer mass 72 than to the balance mass 74 so as to more closely balance the loading.

The driving shaft portion 68 has a cylindrical portion 75 that is received within a drilled passageway 76 formed along one end of the counter balanced portion 67. Thus, this portion of the driving portion 68 is also journalled by the bearing portion 73. In addition, a further bearing surface 77 is formed on the driving shaft portion 68 so as to provide its support in the engine body and specifically in the cylinder block 22.

A crank timing marker 78 is affixed to the driving portion 68 adjacent the timing sprocket 56 so as to assist in setting the valve timing.

A combined torsional damper and backlash take up mechanism, indicated generally by the reference numeral 79, is provided between the balancer shaft portions 67 and 68. This mechanism is comprised of a flange 81 formed at one end of the weighted shaft portions 68. This flange 81 is formed with a further balance mass 82. It should be noted that the balance mass 74 has a lesser axial length than the balance mass 72 and the balance mass 82 is circumferentially aligned with the balance mass 74 and is provided to counter balance the inertial effect of the balance mass 72 between the balance masses 74 and 82.

The torsional damper and backlash take up mechanism 79 is comprised of a backlash take up gear segment 83 that has a geared outer surface that cooperates with the timing gear 54 formed on the driving shaft portion 68 so as to reduce backlash in the gear drive. A Bellville type spring 84 is interposed between the flange 81 and the backlash take up gear segment 83 so as to urge the backlash take up gear segment 83 toward the timing gear 54.

Figure 6:
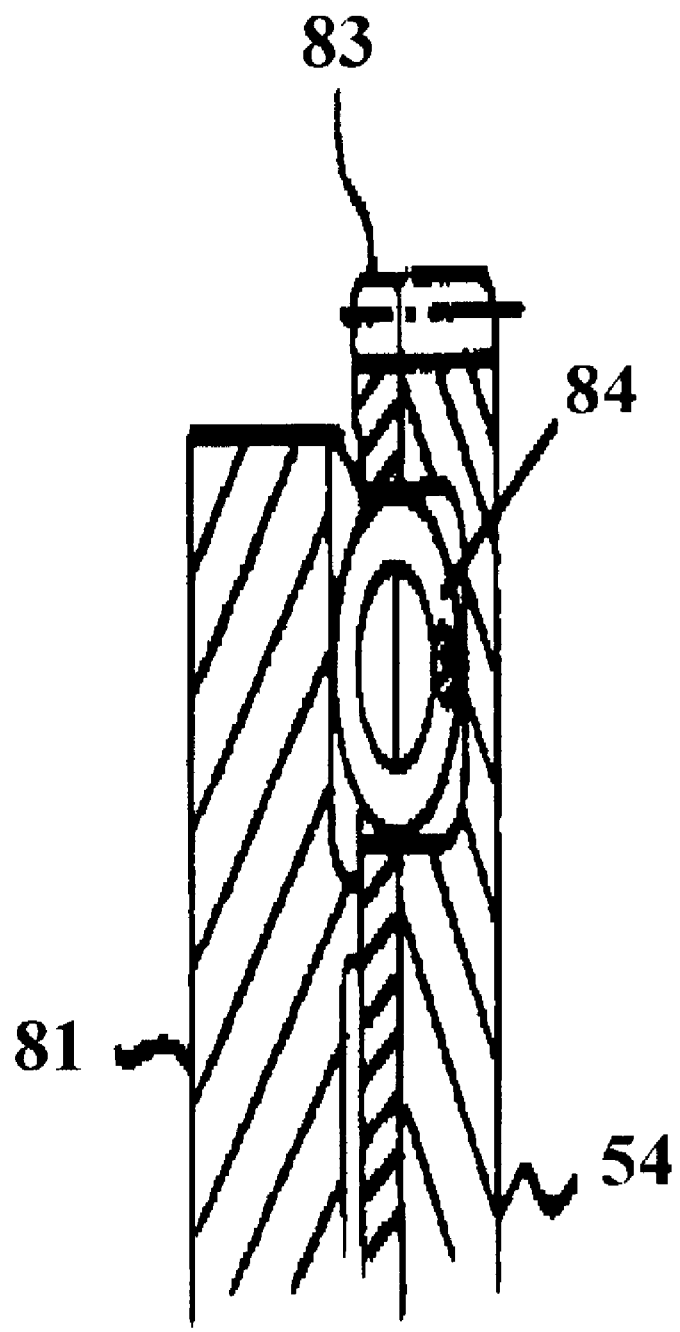
FIG. 6 is an enlarged cross sectional view taken along the line 6—6 of FIG. 5.
Figure 7:
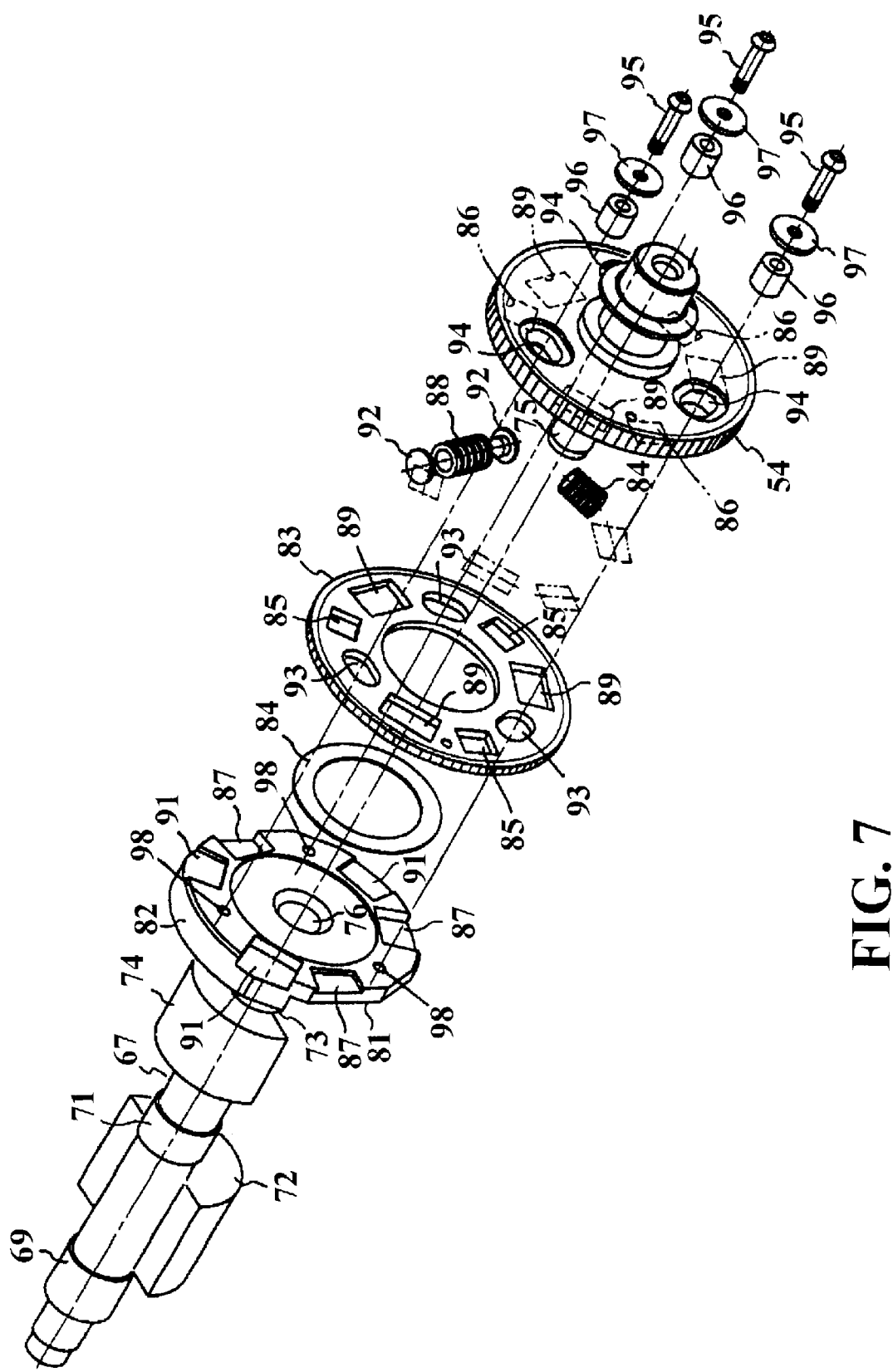
FIG. 7 is an exploded perspective view of the balancer shaft.

As may be best seen in FIG. 6, a first series of three relatively small coil springs 80 are received in windowed openings 85 formed in the backlash take up gear segment 83 and serve to bias the gear segment 83 in a circumferential direction relative to the timing gear 54. These springs 80 are also received in windowed openings 86 formed in the timing gear 54 at circumferentially spaced locations. The coil springs 80 also extend into larger slots 87 formed in the flange 81 so as to maintain them in place while not interfering with their action between the timing gear 54 and gear segment 83 to take up the backlash.

Torsional damping is taken up by a plurality of stiffer coil springs 88 that are received in larger windows 89 formed in the timing gear 54 and in pockets 91 formed in the flange 81 so as to permit torsional rotation between the balancer shaft portion 67 and the timing gear 54 so as to dampen torsional vibrations from the crankshaft from the balance shaft 55 and specifically its portion 67 without interfering with the timing relationship in the timing drive. These springs 88 act against the pockets 91 and 89 through end caps 92.

Finally, the gear portions 54 and 83 are formed with elongated windows 93 through which pass bolts 95 that are surrounded by bushings 96 and bear against washers 97. The ends of the bolts 95 are threaded into tapped openings 98 formed in the flange 81 of the shaft portion 67 so as to maintain axial alignment while permitting the relative rotation for damping. This also limits the degree of relative rotation between the various components.

Thus, it should be apparent that this construction provides not only torsional damping to isolate the balance shaft from the torsional vibrations caused by the crankshaft but also maintain the timing integrity between the crankshaft 27 and the camshafts 41 and 47.

In addition to the various internal accessories drives and the drive for the water pump by the sprocket 60, the various shafts can be employed for driving other accessories. For example, a torsional damper (FIG. 3) indicated by the reference numeral 99 may be affixed to one end of the crankshaft for damping its torsional vibrations.

Again referring now only to FIG. 3 but also to FIG. 2, a drive pulley 101 may be affixed to one end of the balancer shaft and extend outwardly beyond the engine body. This drive pulley drives a drive belt 102, which, in turn, can drive a number of engine accessories and pulleys such as an alternator 103, an idler pulley 104, an air conditioning compressor 105 and a tensioner pulley 106. Since the balancer shaft 55 is disposed at the side of the cylinder block, this pulley drive can be disposed inwardly from the back end of the engine and thus permits these various accessories and pulleys to be disposed within the overall length of the engine, thus further improving its compactness.

An oil pump 107 also may be driven from the balancer shaft 55 or from the crankshaft 27. This circulates lubricant from the crankcase chamber 28 to the various lubricated parts of the engine 21.

Thus, from the foregoing description it should be readily apparent that the described construction provides a very compact overall engine assembly and also one in which the timing of the intake and exhaust camshafts is not affected by a torsional damper that is interposed between the drive gear for the camshafts and the balancer shafts so as to avoid undue loading on the balancer shaft. In addition, the balancer shaft has a bearing arrangement that permits a relatively small size due to the more uniform loading then with the prior art types of constructions. Of course, the foregoing description is that of a preferred embodiment of the invention and various changes and modifications may be made without departing from the spirit and scope of the invention, as defined by the appended claims.

What is claimed is:

1. An internal combustion engine having a crankshaft, at least one camshaft, a balancer shaft with at least one balancer masses thereon and a timing drive for driving said camshaft and said balancer shaft from said crankshaft, said balancer shaft having a drive member that is interposed in and driven by said timing drive and a torsional vibration damper interposed between said drive member and said at least one balancer mass on said balancer shaft for permitting rotation of said balancer mass relative to said drive member and said camshaft.

2. An internal combustion engine as set forth in claim 1 wherein the timing drive drives the balancer shaft directly from the crankshaft and the camshaft from the balancer shaft drive member.

3. An internal combustion engine as set forth in claim 2 wherein the drive member is driven from the crankshaft and drives the camshaft.

4. An internal combustion engine as set forth in claim 3 wherein the drive member comprises a gear having axially split segments circumferentially biased to take up backlash with a related gear.

5. An internal combustion engine as set forth in claim 4 wherein the engine has a cylinder block with plurality of cylinders aligned in a bank, a plurality of pistons each received in a respective one of said cylinders and driving the crankshaft for rotation about a first axis, a cylinder head affixed to said cylinder block, the balancer shaft being rotatable about a second axis parallel to said first axis and offset to one side of said cylinder block, the drive member driving said balancer shaft from said crankshaft at a location spaced from one end of said crankshaft, the camshaft being supported for rotation about in said cylinder head about a third axis parallel to said first and said second axes, the timing drive comprises a second drive means for driving said camshaft at one end thereof from balancer shaft.

6. An internal combustion engine as set forth in claim 1 wherein the drive member comprises a gear having axially split segments circumferentially biased to take up backlash with a related gear.

7. An internal combustion engine as set forth in claim 6 wherein the torsional vibration damper is interposed between one of the axially split segments and the at least one balancer mass.

8. An internal combustion engine as set forth in claim 7 wherein the one of the axially split segments is the one with the greatest axial extent.

9. An internal combustion engine as set forth in claim 8 wherein the balancer shaft is provided with least one pair of offset balance masses formed thereon.

10. An internal combustion engine as set forth in claim 9 wherein the balancer shaft is further provided with integral bearings formed on opposite sides of each of the balance masses.

11. An internal combustion engine as set forth in claim 10 wherein there is a common integral bearing between the pair of balance masses.

12. An internal combustion engine as set forth in claim 11 wherein the pair of balance masses are formed on a weighted portion of the balancer shaft that is rotatable relative to the drive member.

13. An internal combustion engine as set forth in claim 12 wherein the weighted portion of the balancer shaft has a further balance mass spaced from the at least one pair of offset balance masses.

14. An internal combustion engine as set forth in claim 13 wherein the weighted portion of the balancer shaft has a further bearing surface thereon disposed between the at least one pair of offset balance masses and the further balance mass.

15. An internal combustion engine as set forth in claim 14 wherein the engine has a cylinder block with plurality of cylinders aligned in a bank, a plurality of pistons each received in a respective one of said cylinders and driving the crankshaft for rotation about a first axis, a cylinder head affixed to said cylinder block, the balancer shaft being rotatable about a second axis parallel to said first axis and offset to one side of said cylinder block, the drive member driving said balancer shaft from said crankshaft at a location spaced from one end of said crankshaft, the camshaft being supported for rotation about in said cylinder head about a third axis parallel to said first and said second axes, the timing drive comprises a second drive means for driving said camshaft at one end thereof from balancer shaft.

16. An internal combustion engine having a crankshaft, at least one camshaft, a balancer shaft with at least one balancer masses thereon and a timing drive for driving said camshaft and said balancer shaft from said crankshaft, said balancer shaft having a drive member that is interposed in and driven by said timing drive and a torsional vibration damper interposed between said drive member and said at least one balancer mass on said balancer shaft, said drive member comprising a gear having axially split segments of different axial extent circumferentially biased to take up backlash with a related gear, said torsional vibration damper being interposed between the one of the axially split segments having the greatest axial extent and the at least one balancer mass.

17. An internal combustion engine as set forth in claim 16 wherein the balancer shaft is provided with least one pair of offset balance masses formed thereon.

18. An internal combustion engine as set forth in claim 17 wherein the balancer shaft is further provided with integral bearings formed on opposite sides of each of the balance masses.

19. An internal combustion engine as set forth in claim 18 wherein there is a common integral bearing between the pair of balance masses.

20. An internal combustion engine as set forth in claim 19 wherein the pair of balance masses are formed on a weighted portion of the balancer shaft that is rotatable relative to the drive member.

21. An internal combustion engine as set forth in claim 20 wherein the weighted portion of the balancer shaft has a further balance mass spaced from the at least one pair of offset balance masses.

22. An internal combustion engine as set forth in claim 21 wherein the weighted portion of the balancer shaft has a further bearing surface thereon disposed between the at least one pair of offset balance masses and the further balance mass.

23. An internal combustion engine as set forth in claim 22 wherein the engine has a cylinder block with plurality of cylinders aligned in a bank, a plurality of pistons each received in a respective one of said cylinders and driving the crankshaft for rotation about a first axis, a cylinder head affixed to said cylinder block, the balancer shaft being rotatable about a second axis parallel to said first axis and offset to one side of said cylinder block, the drive member driving said balancer shaft from crankshaft at a location spaced from one end of said crankshaft, the camshaft being supported for rotation about in said cylinder head about a third axis parallel to said first and said second axes, the timing drive comprises a second drive means for driving said camshaft at one end thereof from balancer shaft.

* * * * *

UNITED STATES PATENT AND TRADEMARK OFFICE
CERTIFICATE OF CORRECTION

PATENT NO. : 6,405,702 B2
DATED : June 18, 2002
INVENTOR(S) : Tomotaka Takano et al.

It is certified that error appears in the above-identified patent and that said Letters Patent is hereby corrected as shown below:

Column 1,
Line 4, after the heading "BACKGROUND OF THE INVENTION", please insert the following paragraph:

-- This invention relates to a balancer shaft for an internal combustion engine and more particularly to a drive and bearing arrangement for such balancer shafts. --

Column 8,
Line 25, after "from", insert -- said --.

Signed and Sealed this

Fourteenth Day of January, 2003

JAMES E. ROGAN
*Director of the United States Patent and Trademark Office*